United States Patent
Lai et al.

(10) Patent No.: US 8,291,957 B2
(45) Date of Patent: Oct. 23, 2012

(54) TRANSPORTER FOR DRY FILM LAMINATOR

(75) Inventors: Chin-Sen Lai, Taichung (TW); Wei-Hsien Li, Taichung (TW)

(73) Assignee: C Sun Mfg. Ltd., Taichung (TW)

(*) Notice: Subject to any disclaimer, the term of this patent is extended or adjusted under 35 U.S.C. 154(b) by 424 days.

(21) Appl. No.: 12/699,056

(22) Filed: Feb. 3, 2010

(65) Prior Publication Data

US 2011/0186234 A1    Aug. 4, 2011

(51) Int. Cl.
*B32B 37/00* (2006.01)
*B32B 37/16* (2006.01)
*B65H 37/00* (2006.01)

(52) U.S. Cl. ........ 156/540; 156/494; 156/510; 156/516; 156/517; 156/518; 156/523; 156/538; 156/539

(58) Field of Classification Search .......... 156/160, 156/163, 164, 191, 192, 250, 256, 510, 516–518, 156/523, 538–540, 494; 242/566, 615, 615.3, 242/615.4
See application file for complete search history.

(56) References Cited

U.S. PATENT DOCUMENTS

| | | | | |
|---|---|---|---|---|
| 4,671,835 A | * | 6/1987 | Gagnon | 156/160 |
| 5,043,036 A | * | 8/1991 | Swenson | 156/160 |
| 5,106,450 A | * | 4/1992 | Freisitzer et al. | 156/517 |
| 5,328,546 A | * | 7/1994 | Brady et al. | 156/718 |
| 2004/0123940 A1 | * | 7/2004 | Bedzyk | 156/230 |

* cited by examiner

*Primary Examiner* — Mark A Osele
*Assistant Examiner* — Christopher C Caillouet

(57) ABSTRACT

A transporter for dry film laminator includes a base, a film guider mounted in the base, and a film leveler mounted on the base. The base has a platform disposed thereon. The base has two film extending rollers respectively disposed on two ends thereof. The base has two guiding rails disposed on two sides thereof. The film leveler has two ends respectively mounted on the two guiding rails. The film guider is provided for transporting the dry film to the platform.

4 Claims, 4 Drawing Sheets

TRANSPORTER FOR DRY FILM LAMINATOR

BACKGROUND OF THE INVENTION

1. Field of the Invention

The present invention relates to a transporter, and more particularly to a transporter for a dry film laminator.

2. Description of Related Art

A conventional trimming mechanism for semiconductor wafer in accordance with the prior art comprises a housing, a base received in the housing and horizontally disposed on an inner bottom of the housing, and an upper trimming device received in the housing. The upper trimming device is movably suspended from an inner top of the housing via multiple shafts and is able to move upwardly/downwardly relative to the housing. The upper trimming device includes an annular outer member, an annular inner member, and an annular blade mounted on a bottom thereof. A lower device is received in the housing. The lower device is disposed on a top of the base and corresponds to the upper trimming device for holding a wafer. A supply device is disposed beside the lower device for supplying a protecting film. A take-up device is disposed beside the lower device opposite the supply device for collecting the used protecting film.

When the upper trimming device is operated to move downwardly, the protecting film is laminated on the wafer. The annular blade trims the protecting film around the wafer. However, during trimming, the bleeding resin would not be removed clearly. And afterwards the wafer is moved to another stage for enhancing lamination. The resin may bleed out the wafer again. Therefore, the wafer fabrication may have a low yield.

The present invention has arisen to mitigate and/or obviate the disadvantages of the conventional device.

SUMMARY OF THE INVENTION

The main objective of the present invention is to provide an improved transporter, and more particular to a transporter for a dry film laminator.

To achieve the objective, the transporter for a dry film laminator in accordance with the present invention includes a base, a film guider mounted in the base, and a film leveler mounted on the base. The base has a platform disposed thereon for providing for extending and cutting a dry film. The base has two film extending rollers respectively disposed on two ends thereof for extending the dry film. The base having two guiding rails disposed on two sides thereof. The base has a space defined therein and a cutter is received in the space. The space is communicated with the platform such that the cutter extends from the space for cutting the dry film. The base has a shifter mounted on the platform and a vacuum film holder mounted on the shifter. The vacuum film holder is upwardly/downwardly moved relative to the shifter for removing a cut dry film from the platform. The film guider is provided for transporting the dry film to the platform. The film guider includes a supply spool and a take-up spool received in the space. The supply spool is provided for windingly routing the dry film. The take-up spool is provided for windingly receiving the dry film. The film leveler has two ends respectively mounted on the two guiding rails for moving between the two film extending rollers. The film leveler is provided for clamping the dry film. The film leveler has a movable rod having two ends respectively mounted on the two guiding rails for traversing the dry film on the platform. The movable rod has two clampers mounted on two ends thereof for extendingly flattening the dry film.

Further benefits and advantages of the present invention will become apparent after a careful reading of the detailed description with appropriate reference to the accompanying drawings.

DETAILED DESCRIPTION OF THE INVENTION

Figure 1:
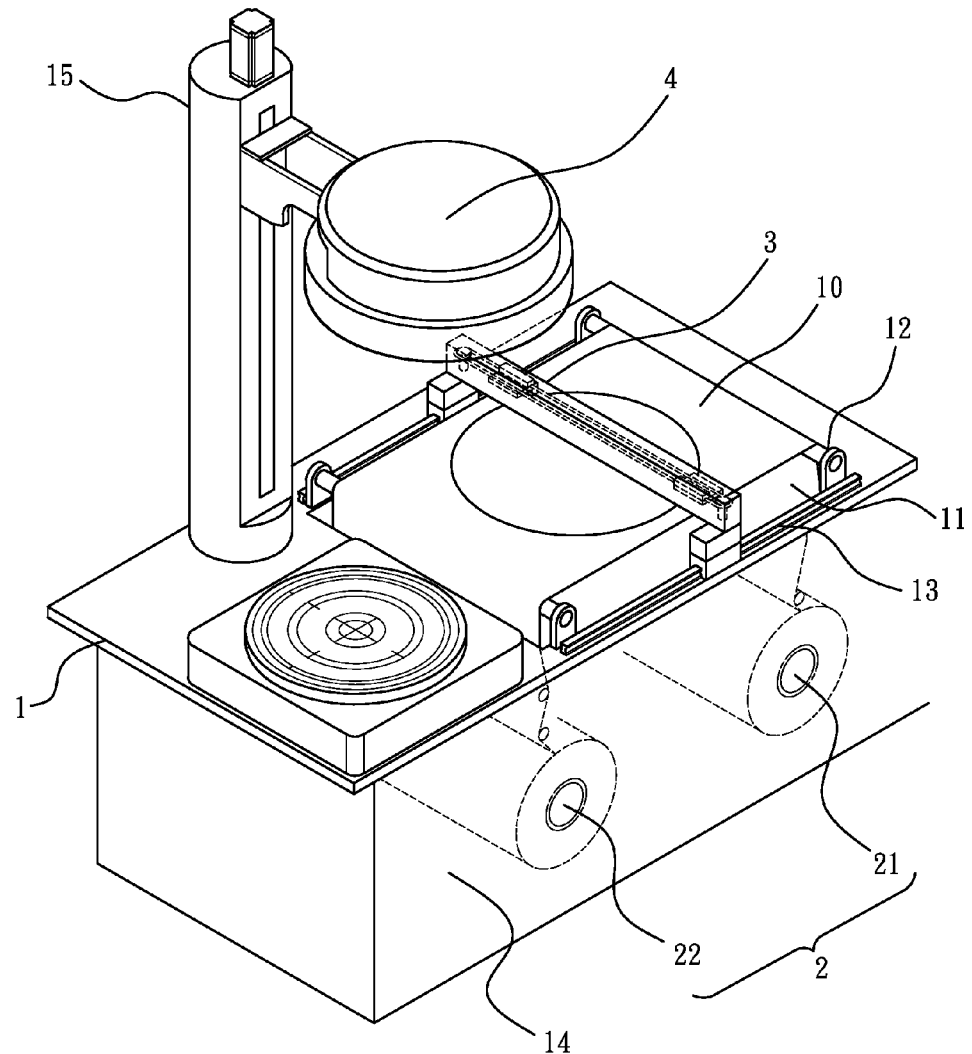
FIG. 1 is a perspective view of a transporter for a dry film laminator in accordance with the present invention.
Figure 2:
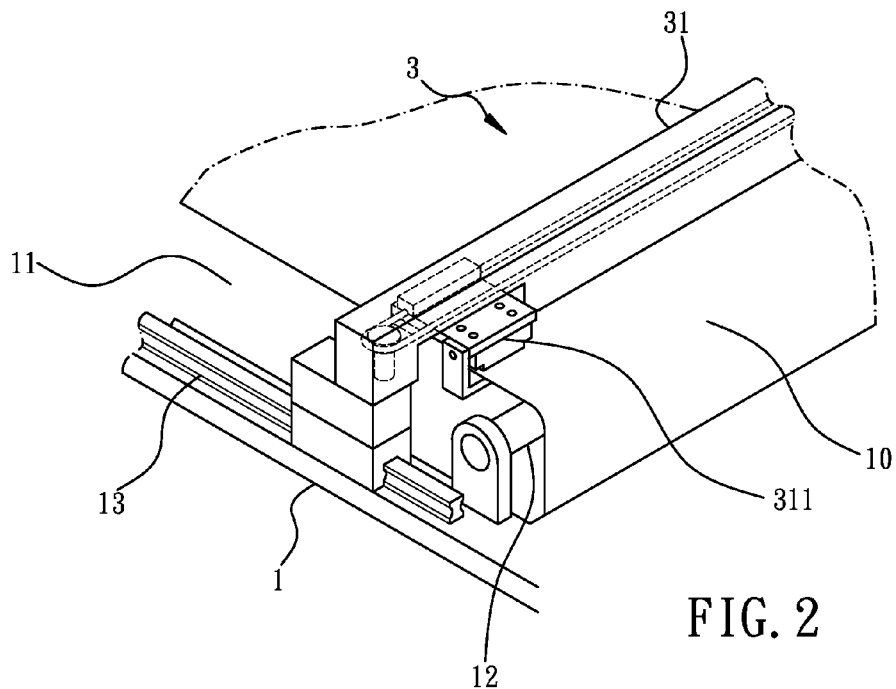
FIG. 2 is a partial enlarged view of the transporter for a dry film laminator in accordance with the present invention.
Figure 3:
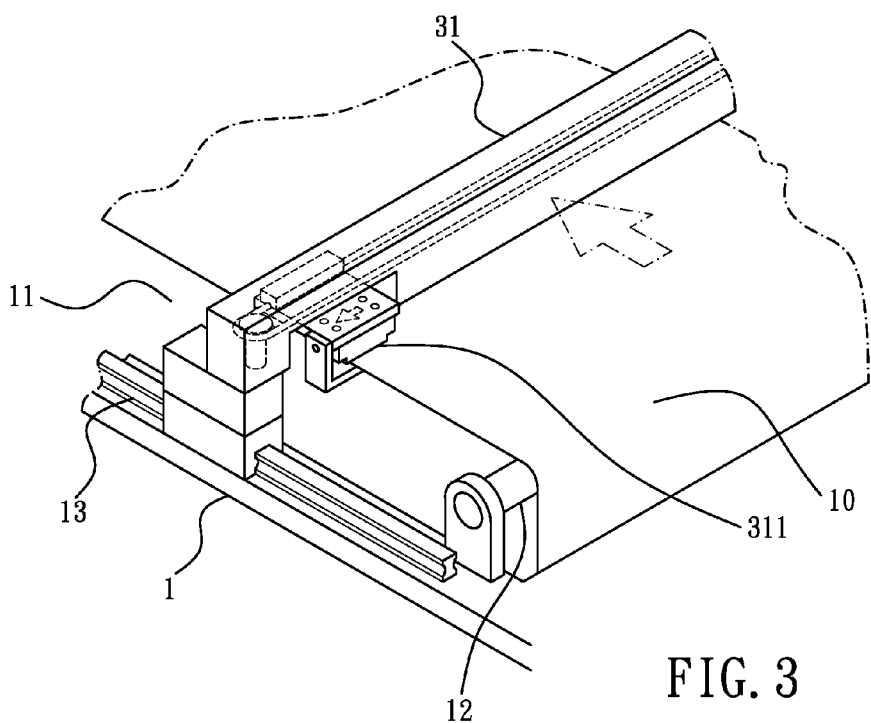
FIG. 3 is a partial enlarged operational view of the transporter for a dry film laminator in accordance with the present invention.
Figure 4:
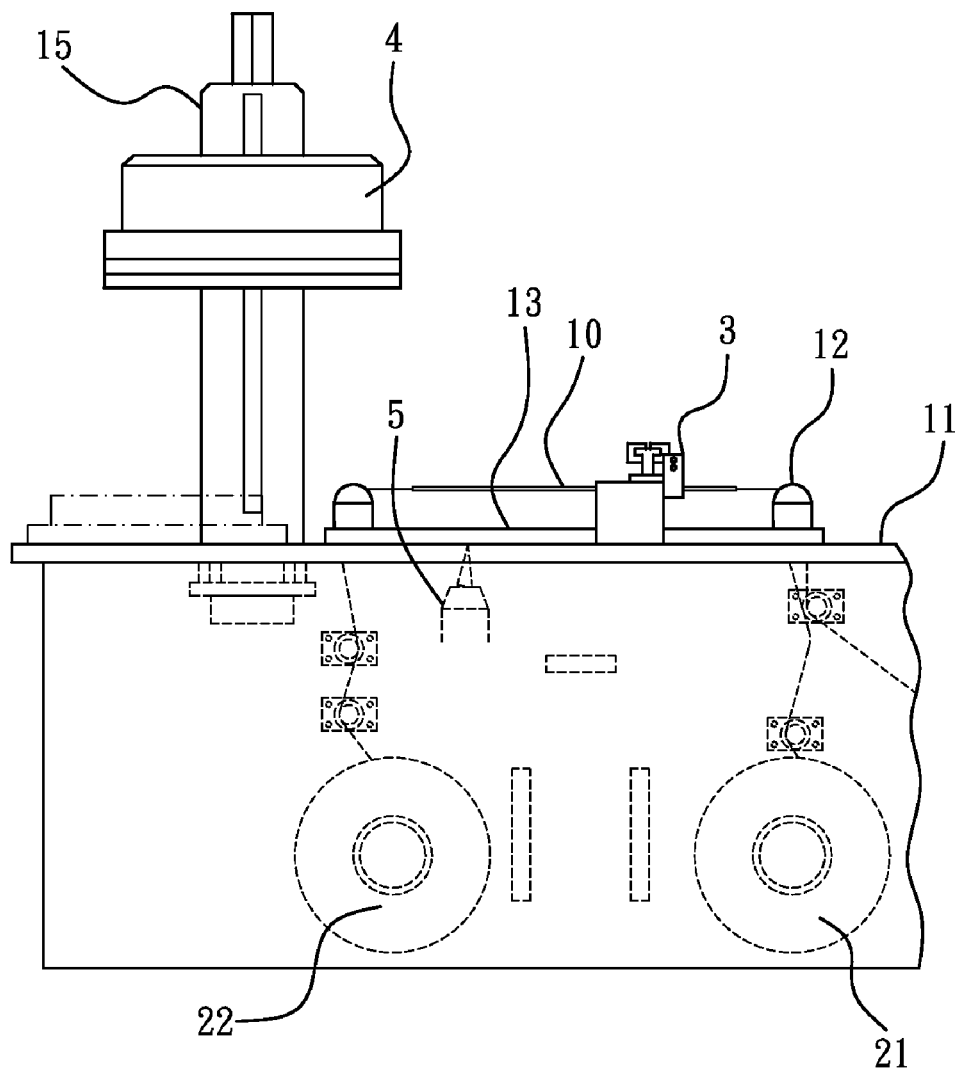
FIG. 4 is a side plane view of the transporter for a dry film laminator in accordance with the present invention.

Referring to the drawings and initially to FIGS. 1-4, a transporter for dry film laminator in accordance with the present invention comprises a base 1, a film guider 2 mounted in the base 1, and a film leveler 3 mounted on the base 1.

The base 1 has a platform 11 disposed thereon for providing for extending and cutting a dry film 10. The base 1 has two film extending rollers 12 respectively disposed on two ends thereof for extending the dry film 10. The base 1 having two guiding rails 13 disposed on two sides thereof. The base 1 has a space 14 defined therein and a cutter 5 is received in the space 14. The space 14 is communicated with the platform 11 such that the cutter 5 extends from the space 14 for cutting the dry film 10. The base 1 has a shifter 15 mounted on the platform 11 and a vacuum film holder 4 mounted on the shifter 15. The vacuum film holder 4 is upwardly/downwardly moved relative to the shifter 15 for removing a cut dry film 10 from the platform 11. The film guider 2 is provided for transporting the dry film 10 to the platform 11. The film guider 2 includes a supply spool 21 and a take-up spool 22 received in the space 14. The supply spool 21 is provided for windingly routing the dry film 10. The take-up spool 22 is provided for windingly receiving the dry film 10. The film leveler 3 has two ends respectively mounted on the two guiding rails 13 for moving between the two film extending rollers 12. The film leveler 3 is provided for clamping the dry film 10. When the film guider 2 transports the dry film 10, the film leveler 3 is simultaneously moved with the dry film 10 for flattening the dry film 10. The film leveler 3 has a movable rod 31 having two ends respectively mounted on the two guiding rails 13 for traversing the dry film 10 on the platform 11. The movable rod 31 has two clampers 311 mounted on two ends thereof for extendingly flattening the dry film 10.

Figure 5:
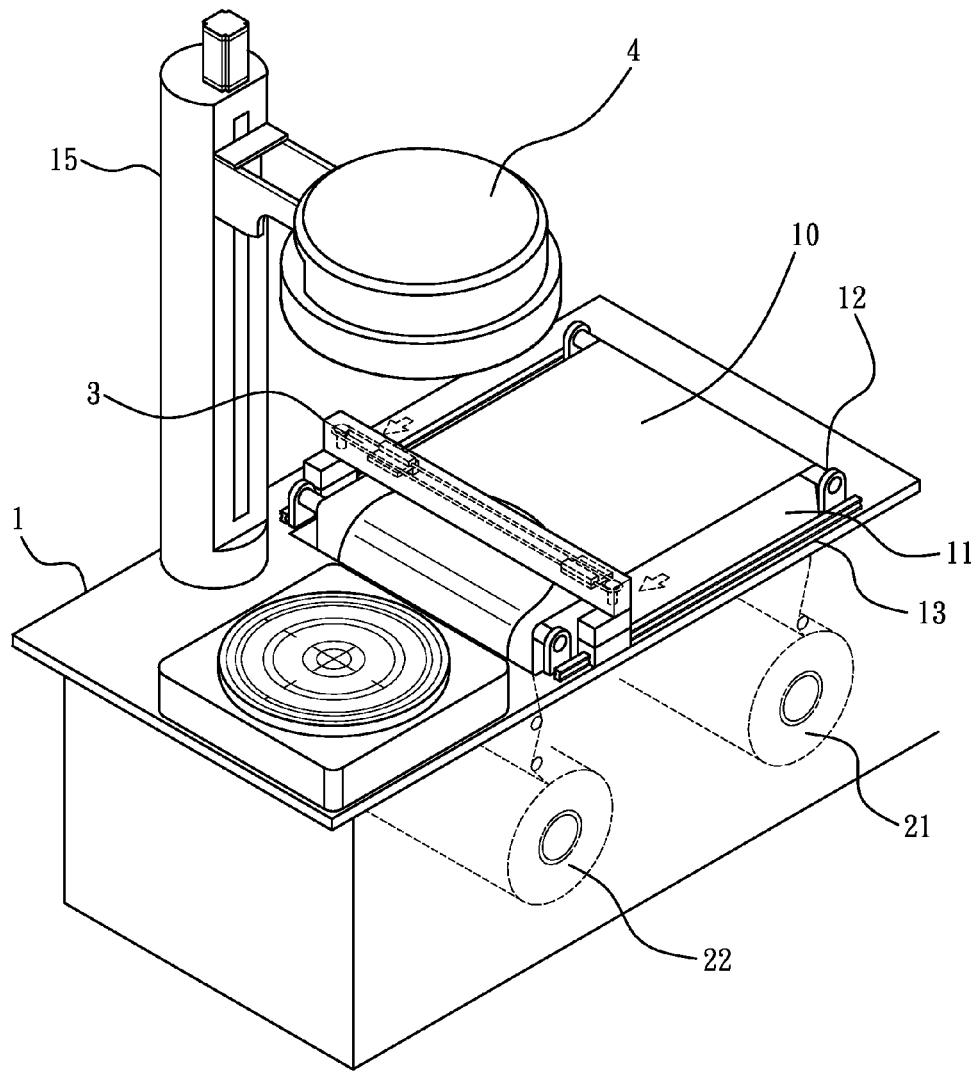
FIG. 5 is an operational view of the transporter for a dry film laminator in accordance with the present invention.

With reference to FIG. 5, when the dry film 10 on the platform 11 is cut, the movable rod 31 is moved to one end of the platform 11 and the clamper 311 extendingly flattens the dry film 10. When the film guider 2 transports an uncut dry film 10 to the platform 11, the movable rod 31 is simultaneously moved to the uncut dry film 10 such that the uncut dry film 10 can be flattened on the platform 11.

When dry film 10 is cut, the dry film 10 is clamped and flattened by the transporter in according with the present. The film leveler 3 is simultaneously moved with the dry film 10 such that the uncut dry film 10 can keep flattening for increasing yield and saving the dry film 10.

Although the invention has been explained in relation to its preferred embodiment, it is to be understood that many other possible modifications and variations can be made without departing from the spirit and scope of the invention as hereinafter claimed.

What is claimed is:

1. A transporter for dry film laminator, comprising:
a base, the base having a platform disposed thereon for providing for extending and cutting a dry film, the base having two film extending rollers respectively disposed on two ends thereof for extending the dry film, the base having two guiding rails disposed on two sides thereof;
a film leveler disposed on the platform, the film leveler having two ends respectively mounted on the two guiding rails for moving between the two film extending rollers, the film leveler provided for clamping the dry film;
wherein the film leveler has a movable rod having two ends respectively mounted on the two guiding rails for traversing the dry film on the platform, the movable rod having two clampers mounted on two ends thereof for extendingly flattening the dry film; and
a film guider mounted in the platform, the film guider provided for transporting the dry film to the platform, the film guider including a supply spool provided for windingly routing the dry film and a take-up spool provided for windingly receiving the dry film;
where when the film guider transports the dry film, the film leveler is simultaneously moved with the dry film for flattening the dry film.

2. The transporter for dry film laminator as claimed in claim 1, wherein the base having a space defined therein and a cutter received in the space, the space communicated with the platform such that the cutter extends from the space for cutting the dry film.

3. The transporter for dry film laminator as claimed in claim 2, wherein the supply spool and the take-up spool are received in the space.

4. The transporter for dry film laminator as claimed in claim 1, wherein the base has a shifter mounted on the platform and a vacuum film holder mounted on the shifter, the vacuum film holder upwardly/downwardly moved relative to the shifter for removing a cut dry film from the platform.

* * * * *